Figures 4, 5:
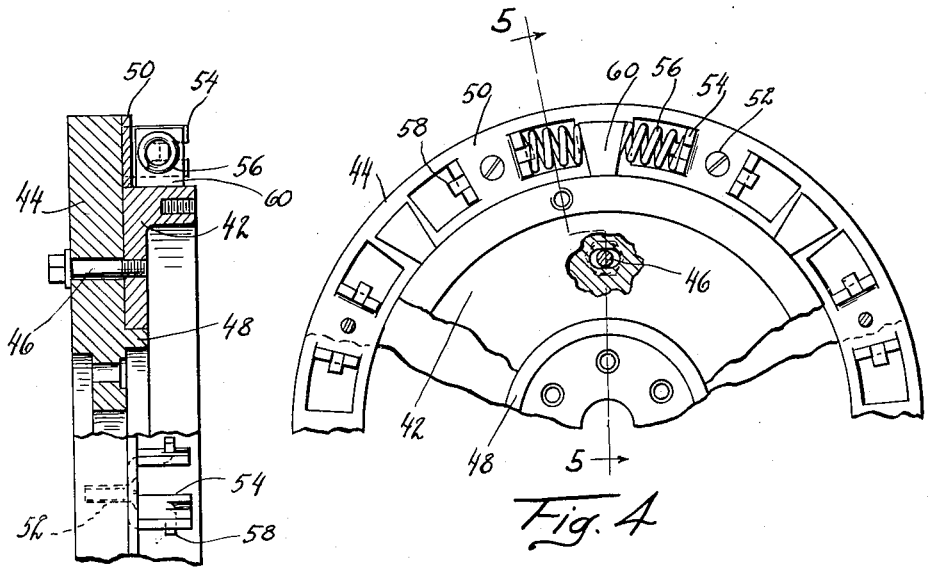

Jan. 16, 1934. J. F. DAUKUS 1,943,517
CUSHION FLYWHEEL
Filed Sept. 12, 1930 3 Sheets-Sheet 1
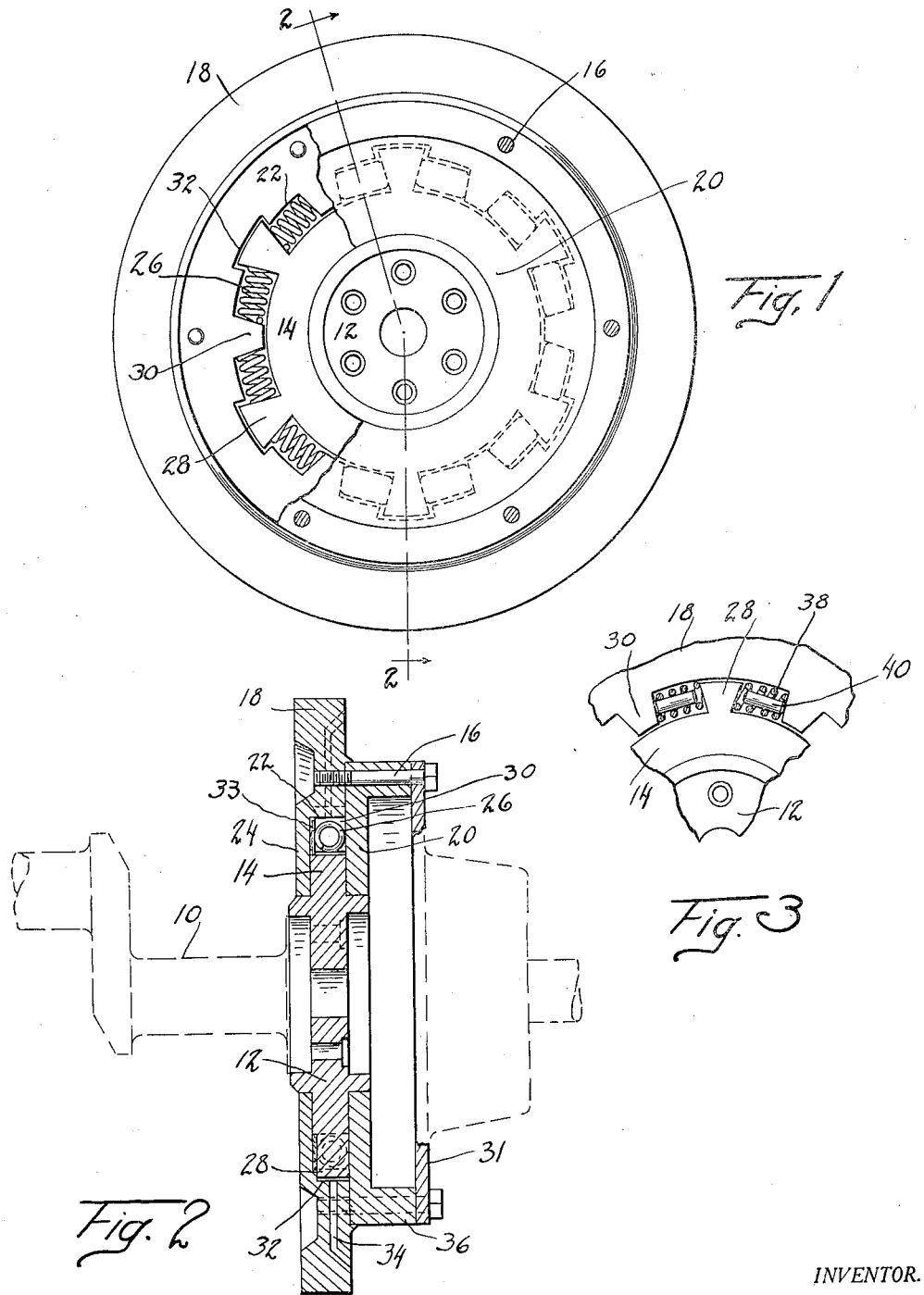
INVENTOR.
John F. Daukus
BY Parker & Burton
ATTORNEYS Jan. 16, 1934.   J. F. DAUKUS   1,943,517
CUSHION FLYWHEEL
Filed Sept. 12, 1930   3 Sheets-Sheet 3
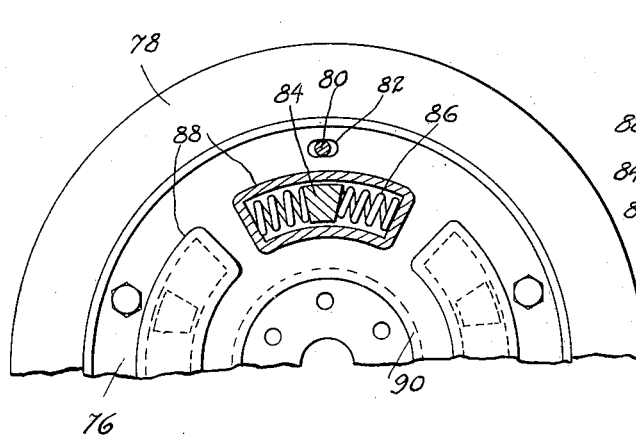
Fig. 8
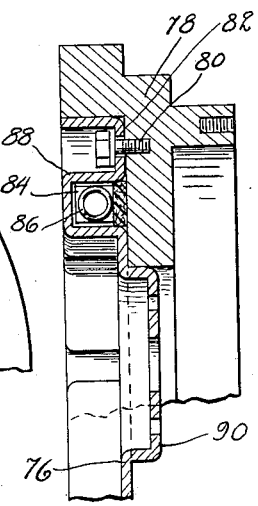
Fig. 9
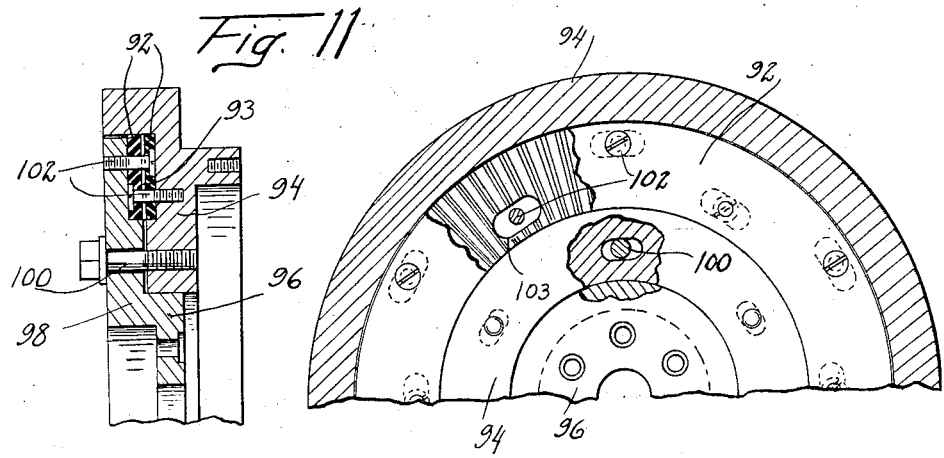
Fig. 11
Fig. 10
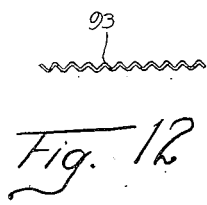
Fig. 12
INVENTOR.
John F. Daukus
BY Parker & Burton
ATTORNEYS Patented Jan. 16, 1934

1,943,517

UNITED STATES PATENT OFFICE 1,943,517

CUSHION FLYWHEEL

John F. Daukus, Detroit, Mich.

Application September 12, 1930
Serial No. 481,387

2 Claims. (Cl. 74—6)

This invention relates to fly wheels and has particular reference to a cushioning type adapted for use in conjunction with the internal combustion engine of an automotive vehicle or power boat.

The object of the invention is to eliminate as completely as possible the transmission of vibrations resulting from varying power impulses imparted to the engine crank shaft from the several cylinders, as well as the natural vibration normally set up by the rotating crank shaft at certain speeds which produce periodical vibrations in addition to those hitherto specified.

An important feature of my invention resides in the particular manner in which I utilize a known principle designed to accomplish this purpose, whereby the disadvantages hitherto incident thereto are eliminated. I propose to construct a composite flywheel composed of two major component parts, an inner member and an outer member, the inner member of which is secured to a rotatable shaft and the outer member of which is yieldingly connected with the inner member for the purpose of permitting a certain amount of lag to the said outer member upon variation, due to periodical vibration and varying power impulses, in the speed of rotation of the inner member. Positive drive connections are provided between the inner and outer members whereby the latter is positively driven by the former after a predetermined yielding movement of the yielding connection.

Heretofore this broad principle has been utilized in much the same manner as described above but there has been no means provided for positively securing the outer, or the driven, member in absolute concentric relation with the inner, or driving, member. This has resulted in the development of an eccentric, or wobbling, action on the part of the driven member due to the loosening of the yielding connection between the two members upon continued rotation of the flywheel assembly at varying speeds. When the driving and driven members fail to remain in accurate concentric relation to one another the utility of the vibration dampening mechanism is completely nullified. For this reason this type of flywheel has been found impractical for extensive use.

I propose to remedy the undesirable effect above specified by seating the outer or driven member positively upon the inner or driving member in concentric relation thereto whereby a positive central axial bearing of the outer upon the inner member is maintained at all times, thus precluding all possibility of the assembly being thrown out of the essential concentric relation. Furthermore, I have so designed this bearing between the outer and inner members that axial displacement between the two members is likewise eliminated.

My improved cushion flywheel is especially suitable for use on power boat engines where the bite of the propeller in the water tends to set up a severe chattering on the flywheel bearings.

A meritorious feature of my invention resides in the simplicity of the parts and the facility with which they may be assembled or replaced.

Figures 6, 7:
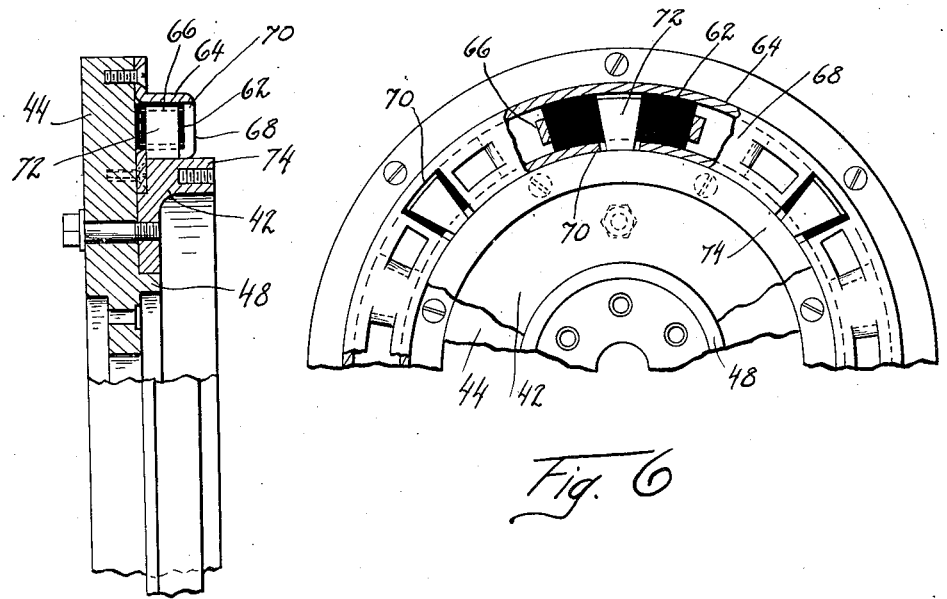

Various other meritorious features will be apparent from the following description taken in conjunction with the drawings wherein like numerals refer to like parts and wherein:

Fig. 1 is an elevation, partly broken away for the sake of clearness, of a preferred form of assembly, Fig. 2 is a section on 2—2 of Fig. 1, Fig. 3 illustrates a slightly modified form of yielding connection, Fig. 4 is a fragmentary elevation, partly broken away for the sake of clearness, of a modified form of structure, Fig. 5 is a section along 5—5 of Fig. 4, Figs. 6 and 7 are views corresponding to Figs. 4 and 5 of another form of structure, Figs. 8 and 9 illustrate still another modification, Figs. 10 and 11 illustrate a modified form of yielding connection, and Fig. 12 is a detail of a frictional element utilized in Figs. 10 and 11.

Referring to the drawings, numeral 10 represents the end bearing of an engine crankshaft to which is secured the inner or driving member 12 of my composite flywheel. The driving member 12 is provided with a central radially extending flange 14. Secured together by means of the bolt 16 are the two ring elements 18 and 20 which form the composite driven, or outer, member of my flywheel assembly. As illustrated in Fig. 1 element 18 is cut away as at 22 to provide the depending flange portion 24 which, together with element 20, constitutes a U-shaped bearing portion. Thus a double central bearing tending to maintain the driving and driven members in accurate concentric relation is provided, and flange 14 positively prevents axial displacement of the two.

Coil springs 26 may be inserted about the peripheral face of the flange 14, one end of each spring 26 abutting a series of radially projecting lugs 28 which are provided at spaced apart intervals around the periphery of flange 14. The bottom of the U-shaped housing portion built up of the elements 18 and 20 is provided at spaced apart intervals around its periphery with inwardly projecting radial lugs 30 against which the opposite end of each of the coil springs 26 is adapted to seat.

Substantially midway between each of the spaced apart lugs 30 there is a cut away portion 32 designed to receive the outer end of corresponding lugs 28 and providing a small clearance for relative rotary movement of the two elements. It is to be noted that the face portions of lugs 28 and 30 which constitute the seats for the coil springs 26 are substantially parallel rather than truly radial.

It will be noted that the bolt 16 also retains the cover plate 31 in position, thus serving a dual function and simplifying the structure as well as the assembling thereof.

The resulting action is obvious, the coil springs 26 functioning to provide a yielding connection between the inner driving member 12 and the outer composite driven member built up of rings 18 and 20, whereby variable power impulses of driving element 12 will be absorbed, thereby eliminating the transmission of such impulses to the outer driven member. Only a small amount of lag of the driven member 18—20 behind the driving member 12 is permitted, however, due to the small clearance given the outer extremity of lugs 28. This clearance having been taken up at either end, a positive drive is provided between the two members. Due to the fact that the seat at each end of the springs is substantially parallel to the opposed seat at the other end of the spring there will be no tendency for the springs to curve either outwardly or inwardly upon their compression and thereby rub against the inner or outer wall of their casings. This eliminates all wear on the springs and insures long life with little necessity for replacement. Lubrication of the coil springs and between the relatively movable driving and driven elements 12 and 18 may be secured by means of lubricant absorbing cushion pads 33 (see Figs. 2 and 9), which may be of felt or any absorbent material, against which the sides of coil springs 26 are adapted to seat, and which may be lubricated through a small drilled aperture 34.

It will be noted that the ring element 20 of the composite driven member of the flywheel is provided with an annular flange 36 to which the clutch mechanism of the vehicle may be secured.

Fig. 3 illustrates a somewhat different form of stop for providing a positive drive between the driving and driven members after taking up the yield permitted by the coil springs 38. This positive stop consists of a pin 40 seated within the coil of each spring against which the lugs 28 and 30 are adapted to bear after a limited compression of the springs.

Figs. 4 and 5 disclose a somewhat modified structure wherein the driven element 42 is secured to the driving element 44 by means of a bolt 46. The bolt 46 extends through a slot in element 44 and is threaded into element 42, thus permitting slight relative rotary movement between the driving and driven members. Driving element 44 is provided with a projecting flange 48 which functions as a centering bearing for the driven member 42, thus providing a single bearing corresponding to the double bearing illustrated in the form disclosed by Figs. 1 and 2. An annular plate 50 is secured about the outer circumference of driving member 44 by means of screws 52. This annular plate may be stamped prior to securing it in position with a plurality of tabs which may be bent outwardly to produce the stops 54 which constitute seats for the corresponding ends of coil springs 56. A small lug 58 is turned up from the central portion of each of the outwardly projecting stops 54 to provide centering means for the said corresponding ends of the coil spring 56.

Driven member 42 is provided at spaced apart intervals with radially extending lugs 60 which form seats for the opposite ends of coil springs 56. The action of this assembly is like that of the structure disclosed in Figs. 1 and 2.

In lieu of the lugs 58 seats for the springs may be drilled in the stops 54.

Figs. 6 and 7 disclose another form of assembly wherein rubber cushions 62 are seated in a housing 64 screwed to the face of driving member 44. Lugs 66 corresponding to the lugs 54, in the modification of Figs. 4 and 5, are struck in from face 68 of the housing 64 and slots 70 in the lower wall thereof are adapted to receive the radially projecting lugs 72 which form a portion of the driven member 42. It will be understood that while I have illustrated the use of springs to form the yiledable connections between the driving and driven elements, it lies within the scope of my inventive concept to substitute therefor molded rubber blocks, or any such yieldable elemen which will accomplish the desired object. In this modification the annular flanges 74 and 48 each constitute a centering bearing for the driven member 42. Here again the possibility of decentering the two elements during rotation thereof is eliminated.

A slightly modified form of structure is illustrated in Figs. 8 and 9 wherein a rolled sheet metal housing 76 constitutes the driving element and is secured to the driven element 78 by means of bolts 80 extending through slots 82 in the housing 76 and threaded into the said driven element 78. Lugs 84 extend outwardly from the face of the driven element 78 at spaced apart intervals and opposite sides thereof form seats for the coil springs 86. Housing member 76 may be formed into a plurality of individual housings 88 extending outwardly at spaced apart intervals circumferentially about the face of the element, and the opposite ends of each of these individual housings function as seats for opposed ends of springs 86. The adjacent ends of the springs, as aforesaid, being seated against the projecting lug 84, the limit of relative rotary displacement between the driving and driven members 76 and 78 is determined by the extent of the slot 82. The driven element 78 is seated upon a central drum portion 90 formed in the central portion of driving element 76, thus providing a centering bearing therefor and eliminating the possibility of eccentric rotation.

Figs. 10–12 illustrate a form wherein annular rings of yielding material 92, such as molded rubber, have been placed in frictional contacting position to take the place of the coil springs illustrated in the other modifications. In this form the driven member 94 is seated upon a drum-like center portion 96 of the driving element 98 to provide a central bearing. The bolt 100 extending through a slot in driving element 98 and threaded into driven element 94 provides the positive drive heretofore described. The annular rubber rings are secured in frictional contact with respective faces of an annular corrugated metal disc 93, as indicated in Fig. 11, by means of screws 102, each screw extending through both annular rubber rings, being countersunk in its relative outer disc and threaded into the driving and driven members respectively. Those discs into which the respective screws 102 are countersunk are provided with slots through which the said screws extend, and corrugated disc 93 is likewise provided with slots 103, thereby permitting the relative rotary motion and at the same time affording a yielding resistance to said motion, the limit of which is determined by the length of the slot through which the bolt 100 extends.

Having described several forms of my inventive concept, various others will be apparent to those skilled in the art and I therefore wish to limit myself only within the scope of the appended claims.

1. A cushion flywheel including, in combination, an inner axial member having an annular flange extending around the central portion of its peripheral face, an outer peripheral member having a centrally disposed annular groove, the wall extremities of which are adapted to seat on the peripheral face of said inner member adjacent each side of the flange, and cooperating yielding and rigid driving connections between said members.

2. Cushion flywheel mechanism comprising, in combination, an axial inner rotatable member having a centrally disposed flange extending radially around its peripheral face, a composite outer peripheral member including two elements united to form a U-shaped inner peripheral groove adapted to seat about said flange and provide an annular recess within the flywheel assembly, oppositely directed radial extending abutments, projecting alternately from the outer and inner members to form a plurality of compartments, coil springs seated within each of said compartments, an annular flange extending around the face of one element of said composite outer member, a cover plate adapted to seat upon said annular flange, and means for securing the composite elements of said outer member and said cover plate integrally.

JOHN F. DAUKUS.